United States Patent
Zhao

(10) Patent No.: US 10,616,133 B2
(45) Date of Patent: Apr. 7, 2020

(54) RESOURCE CONFIGURATION METHOD AND NETWORK DEVICE THEREOF

(71) Applicant: Huawei Technologies Co., Ltd., Shenzhen (CN)

(72) Inventor: Kai Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 16/016,343

(22) Filed: Jun. 22, 2018

(65) Prior Publication Data

US 2018/0302337 A1 Oct. 18, 2018

Related U.S. Application Data

(63) Continuation of application No. PCT/CN2017/073066, filed on Feb. 7, 2017.

(30) Foreign Application Priority Data

Mar. 3, 2016 (CN) .......................... 2016 1 0119659

(51) Int. Cl.
*G06F 15/16* (2006.01)
*H04L 12/911* (2013.01)
(Continued)

(52) U.S. Cl.
CPC .......... *H04L 47/82* (2013.01); *G06F 9/45558* (2013.01); *G06F 9/50* (2013.01);
(Continued)

(58) Field of Classification Search
CPC ........................................... G06F 2009/45587
See application file for complete search history.

(56) References Cited

U.S. PATENT DOCUMENTS 9,270,701 B1 2/2016 Lamb et al.
9,807,119 B2 * 10/2017 Watson ............... H04L 41/0273
(Continued)

FOREIGN PATENT DOCUMENTS

CN 102769615 A 11/2012
CN 103001945 A 3/2013
(Continued)

OTHER PUBLICATIONS

Shinder et al, "Next-Generation Datacenter Security Implementation Guidelines," XP055530187 (Mar. 2015).

*Primary Examiner* — Hieu T Hoang
(74) *Attorney, Agent, or Firm* — Leydig, Voit & Mayer, Ltd.

(57) ABSTRACT

The application provides a resource configuration method in a cloud environment and a network device, where the method includes: determining M security zones of a target application and a first mapping relationship between the M security zones and N modules of the target application; sending a first request message to an infrastructure as a service IaaS layer device, to request the IaaS layer device to create one IaaS tenant corresponding to each security zone of the M security zones; receiving a first response message sent by the IaaS layer device; determining a third mapping relationship between the N modules and the M IaaS tenants; and requesting the IaaS layer device to allocate a virtual machine resource to an $i^{th}$ module by using an IaaS tenant corresponding to the $i^{th}$ module of the N modules. The method can implement virtual resource isolation between different modules of an application.

10 Claims, 11 Drawing Sheets

(51) Int. Cl.
*H04L 29/08* (2006.01)
*G06F 9/50* (2006.01)
*G06F 9/455* (2018.01)
*H04L 29/06* (2006.01)

(52) U.S. Cl.
CPC ............ *G06F 9/5077* (2013.01); *H04L 29/08* (2013.01); *H04L 63/0209* (2013.01); *H04L 67/10* (2013.01); *G06F 2009/45587* (2013.01)

(56) References Cited

U.S. PATENT DOCUMENTS

| | | | | |
|---|---|---|---|---|
| 10,324,701 | B1* | 6/2019 | Stickle | G06F 8/71 |
| 10,469,304 | B1* | 11/2019 | Kempe | H04L 41/22 |
| 2012/0304174 | A1 | 11/2012 | Arnold et al. | |
| 2014/0040999 | A1* | 2/2014 | Zhang | G06F 21/31 |
| | | | | 726/5 |
| 2014/0052877 | A1* | 2/2014 | Mao | H04L 61/103 |
| | | | | 709/245 |
| 2014/0196113 | A1* | 7/2014 | Chen | H04L 63/20 |
| | | | | 726/3 |
| 2015/0237041 | A1* | 8/2015 | Flamini | H04L 63/0807 |
| | | | | 726/10 |
| 2015/0242197 | A1 | 8/2015 | Alfonso et al. | |
| 2015/0271255 | A1* | 9/2015 | Mackay | H04L 67/101 |
| | | | | 709/226 |
| 2015/0373004 | A1* | 12/2015 | Hopkins | G06F 16/278 |
| | | | | 726/6 |
| 2015/0379425 | A1* | 12/2015 | Dirac | G06N 20/00 |
| | | | | 706/12 |
| 2016/0078361 | A1* | 3/2016 | Brueckner | H04L 67/10 |
| | | | | 706/12 |
| 2016/0094483 | A1* | 3/2016 | Johnston | H04L 47/827 |
| | | | | 709/226 |
| 2016/0294728 | A1* | 10/2016 | Jain | H04L 47/82 |
| 2018/0124118 | A1* | 5/2018 | Wu | H04L 43/026 |
| 2018/0316730 | A1* | 11/2018 | Schaefer | H04L 41/0883 |

FOREIGN PATENT DOCUMENTS

| | | |
|---|---|---|
| CN | 103354530 A | 10/2013 |
| CN | 103607308 A | 2/2014 |
| CN | 103747059 A | 4/2014 |
| CN | 105335235 A | 2/2016 |
| WO | 2013185166 A1 | 12/2013 |

* cited by examiner

RESOURCE CONFIGURATION METHOD AND NETWORK DEVICE THEREOF

CROSS-REFERENCE TO RELATED APPLICATIONS

This application is a continuation of International Application No. PCT/CN2017/073066, filed on Feb. 7, 2017, which claims priority to Chinese Patent Application No. 201610119659.8, filed on Mar. 3, 2016. The disclosures of the aforementioned applications are hereby incorporated by reference in their entireties.

TECHNICAL FIELD

Embodiments of the present invention relate to the communications field, and more specifically, to a resource configuration method in the cloud computing field and a network device thereof.

BACKGROUND

With development of technologies, application of cloud computing becomes more popular, and a large quantity of applications need to be deployed to virtual resources provided by a cloud computing service, so as to reduce device costs and implement efficient operation and maintenance.

An application with a complex topological structure, such as a telecommunication service application, usually includes multiple functional modules, and each functional module is responsible for a respective expertise field. Information security requirements for the modules of the application are usually inconsistent. Therefore, during actual deployment, a user requires that the modules are deployed in different network security zones, and a firewall is configured between the security zones, so as to control cross-zone information traffic.

When such an application with a complex structure is deployed in a cloud computing environment, security zone division and cross-zone access permission configuration also need to be performed to meet an information security requirement.

Infrastructure as a service (IaaS) is a cloud computing service form that provides a virtual resource. As a service, the IaaS provides a virtual resource service capability for a tenant, and the tenant may obtain a virtual resource from the IaaS. The virtual resource is obtained by dividing, by using a virtualization technology, a physical resource into multiple independent parts that can be used by the tenant. These parts have all characteristics of the original physical resource that are effective to the user. These divided resources are "virtual resources".

To ensure that each tenant uses the virtual resource without mutual interference, the IaaS performs resource isolation on a tenant basis. With tenant isolation, a tenant A can operate only a virtual resource of A by using an IaaS interface and cannot operate a virtual resource of another tenant.

The IaaS may provide a network resource for the tenant at the same time, and implement network access control by means of network resource configuration. The network resource is a virtual resource, such as a virtual switch, a virtual network, or a security group, that is generated and managed by the IaaS and that is used for network formation and control. For example, an OpenStack cloud computing management platform provides a security group. The security group may be configured with an inflow and outflow traffic control policy for a virtual machine (VM). Virtual machines in a same security group may access each other by using a network, and cross-security-group network access is constrained by the traffic control policy of the security group. Therefore, the tenant may implement security zone division by creating different security groups.

A virtual resource isolation mechanism is provided between tenants by the IaaS. Although VMs in different security groups of a same tenant can perform network resource traffic control, a VM in a security group of the same tenant may still invoke the IaaS interface by using a management network, to operate a virtual resource of another security group of the same tenant. Therefore, a security risk of IaaS virtual resource invocation exists.

In a cloud computing scenario, an application requires that not only network resource traffic control can be performed between security zones, but also virtual resource isolation can be performed.

SUMMARY

Embodiments of the present invention provide a resource configuration method in a cloud environment and a network device, so that cross-security-zone virtual resource isolation can be implemented.

According to a first aspect, a resource configuration method in a cloud environment is provided, including: determining M security zones of a target application and a first mapping relationship between the M security zones and N modules of the target application, where $M \leq N$, N is an integer, and M is an integer greater than 1; sending a first request message to an infrastructure as a service IaaS layer device, where the first request message is used to request the IaaS layer device to create one IaaS tenant corresponding to each security zone of the M security zones, to obtain M IaaS tenants; receiving a first response message sent by the IaaS layer device, where the first response message carries a second mapping relationship between the M security zones and the M IaaS tenants; determining a third mapping relationship between the N modules and the M IaaS tenants according to the first mapping relationship and the second mapping relationship; and requesting the IaaS layer device to allocate a virtual machine resource to an $i^{th}$ module according to the third mapping relationship and by using an IaaS tenant corresponding to the $i^{th}$ module of the N modules, where $1 \leq i \leq N$.

It should be understood that a process in which the first request message requests the IaaS layer device to create the M IaaS tenants may also be referred to as a process of creating the M IaaS tenants by invoking an interface of the IaaS layer device.

It should be further understood that allocating the virtual machine resource to the $i^{th}$ module by using the IaaS tenant corresponding to the $i^{th}$ module of the N modules means that when invoking an IaaS interface to apply for the virtual machine resource, a deployment system needs to transfer identity authentication data of the IaaS tenant. Therefore, creating a VM resource by using identity authentication data of the IaaS tenant corresponding to the $i^{th}$ module is allocating the virtual machine resource to the $i^{th}$ module by using the IaaS tenant corresponding to the $i^{th}$ module.

According to this embodiment of the present invention, the application is divided into at least two security zones, one corresponding IaaS tenant is created in each security zone of the at least two security zones, and a required virtual machine resource is allocated, by using the IaaS tenant corresponding to each security zone, to a module corresponding to the security zone. In this way, virtual resource isolation can be implemented by dividing the application into different modules of different security zones.

With reference to the first aspect, in a first possible implementation of the first aspect, the requesting the IaaS layer device to allocate a virtual machine resource to an $i^{th}$ module according to the third mapping relationship and by using an IaaS tenant corresponding to the $i^{th}$ module of the N modules includes: determining M security groups corresponding to the M security zones, where a fourth one-to-one mapping relationship exists between the M security zones and the M security groups; determining, according to the first mapping relationship and the fourth mapping relationship, a security group to which the $i^{th}$ module pertains; and sending a second request message to the IaaS layer device, where the second request message is used to request the IaaS layer device to configure the security group to which the $i^{th}$ module pertains into an allowed access security group of the virtual machine resource of the $i^{th}$ module.

With reference to the first aspect and the foregoing implementation, in a second possible implementation of the first aspect, the determining M security groups corresponding to the M security zones includes: sending a third request message to the IaaS layer device, where the third request message is used to request the IaaS layer device to create one security group corresponding to each security zone of the M security zones, to obtain the M security groups; and receiving a second response message sent by the IaaS layer device, where the second response message carries the fourth mapping relationship between the M security zones and the M security groups.

With reference to the first aspect and the foregoing implementations, in a third possible implementation of the first aspect, the method further includes: determining a fifth mapping relationship between the M IaaS tenants and the M security groups according to the second mapping relationship between the M security zones and the M IaaS tenants and the fourth mapping relationship between the M security zones and the M security groups; and sending a fourth request message to the IaaS layer device, where the fourth request message is used to request the IaaS layer device to configure, according to the fifth mapping relationship, a $j^{th}$ security group of the M security groups to be used by a $j^{th}$ IaaS tenant of the M tenants, and $1 \le j \le M$.

It should be understood that configuring the $j^{th}$ security group to be used by the $j^{th}$ IaaS tenant is enabling a use permission of the $j^{th}$ security group for the $j^{th}$ tenant.

With reference to the first aspect and the foregoing implementations, in a fourth possible implementation of the first aspect, the determining M security zones of a target application and a first mapping relationship between the M security zones and N modules of the target application includes: obtaining the identifier information of each security zone of the M security zones from an application design template of the target application; obtaining identifier information of each module of the N modules and obtaining identifier information of a security zone corresponding to each module of the N modules from the application design template of the target application; and determining the first mapping relationship between the M security zones and the N modules according to the identifier information of each security zone of the M security zones and the identifier information of the security zone corresponding to each module of the N modules.

According to a second aspect, a virtual resource configuration method in a cloud environment is provided, including: receiving a first request message sent by a deployment device, where the first request message carries identifier information of each security zone of M security zones of a target application, and M is an integer greater than 1; creating, according to the first request message, one IaaS tenant corresponding to each security zone of the M security zones, to obtain M IaaS tenants and a first mapping relationship between the M IaaS tenants and the M security zones; and returning a first response message to the deployment device, where the first response message carries the first mapping relationship.

According to this embodiment of the present invention, the application is divided into at least two security zones, one corresponding IaaS tenant is created in each security zone of the at least two security zones, and a required virtual machine resource is allocated, by using the IaaS tenant corresponding to each security zone, to a module corresponding to the security zone. In this way, the created application can implement virtual resource isolation between different security zones, and virtual resource isolation between modules of different security zones is implemented.

With reference to the second aspect, in a first possible implementation of the second aspect, the method further includes: receiving a second request message sent by the deployment device; and allocating a virtual machine resource to an $i^{th}$ module according to the second request message and by using an IaaS tenant corresponding to the $i^{th}$ module of N modules included in the target application, where the second request message carries a second mapping relationship between the N modules and the M IaaS tenants, $1 \le i \le N$, $M \le N$, and N is an integer.

With reference to the second aspect or the first possible implementation of the second aspect, in a second possible implementation of the second aspect, before the allocating a virtual machine resource to an $i^{th}$ module, the method further includes: receiving a third request message sent by the deployment device; creating, according to the third request message, one security group corresponding to each security zone of the M security zones, to obtain M security groups and a third mapping relationship between the M security groups and the M security zones; and sending a second response message to the deployment device, where the second response message carries the third mapping relationship between the M security zones and the M security groups.

With reference to the second aspect or the first possible implementation of the second aspect, in a third possible implementation of the second aspect, the allocating a virtual machine resource to an $i^{th}$ module includes: receiving a fourth request message sent by the deployment device; and configuring, according to the fourth request message, a security group to which the $i^{th}$ module pertains as an allowed access security group of the virtual machine resource of the $i^{th}$ module, where the fourth request message carries a fourth mapping relationship between the M security groups and the N modules.

With reference to the second aspect or the first possible implementation of the second aspect, in a fourth possible implementation of the second aspect, the method further includes: receiving a fifth request message sent by the deployment device; and configuring, according to the fifth request message, a $j^{th}$ security group of the M security groups to be used by a $j^{th}$ IaaS tenant of the M tenants, where the fifth request message includes a fifth mapping relationship between the M security groups and the M IaaS tenants, and $1 \le j \le M$.

According to this embodiment of the present invention, the application is divided into at least two security zones, one corresponding IaaS tenant is created in each security zone of the at least two security zones, and a required virtual machine resource is allocated, by using the IaaS tenant corresponding to each security zone, to a module corresponding to the security zone. Further, a corresponding security group is created for the IaaS tenant corresponding to each security zone. In this way, the created application can implement both virtual resource isolation between different security zones, and network traffic control between different security groups.

According to a third aspect, a network device is provided, including a determining unit, a creation unit, and a receiving unit. The network device is configured to execute the method according to the first aspect or any possible implementation of the first aspect.

According to a fourth aspect, a network device is provided, including a receiving unit, a creation unit, and a sending unit. The network device is configured to execute the method according to the second aspect or any possible implementation of the second aspect.

According to a fifth aspect, an apparatus is provided, including a processor, a receiver, a transmitter, and a memory. The processor and the memory are connected by using a bus system, the memory is configured to store an instruction, and the processor is configured to execute the instruction stored in the memory, to control the receiver to receive a signal, and control the transmitter to send a signal, so that the apparatus executes the method according to the first aspect or any possible implementation of the first aspect.

According to a sixth aspect, an apparatus is provided, including a processor, a memory, a receiver, and a transmitter. The processor, the memory, and the receiver are connected by using a bus system, the memory is configured to store an instruction, and the processor is configured to execute the instruction stored in the memory, to control the receiver to receive a signal, and control the transmitter to send a signal, so that the apparatus executes the method according to the second aspect or any possible implementation of the second aspect.

According to a seventh aspect, a computer readable medium is provided, where the computer readable medium is configured to store a computer program. The computer program includes an instruction used to execute the method according to the first aspect or any possible implementation of the first aspect.

According to an eighth aspect, a computer readable medium is provided, where the computer readable medium is configured to store a computer program. The computer program includes an instruction used to execute the method according to the second aspect or any possible implementation of the second aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
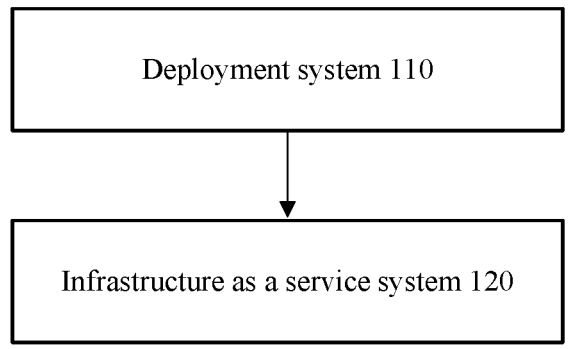
FIG. 1 is a schematic block diagram of a system architecture according to an embodiment of the present invention.

FIG. 1 is a schematic block diagram of a system architecture according to an embodiment of the present invention. As shown in FIG. 1, the system architecture includes a deployment system 110 and an infrastructure as a service system 120. The deployment system 110 provides an interaction interface for a user to deploy an application, reads design data in an application design file, and invokes an interface in the infrastructure as a service system 120 (such as an OpenStack architecture) to create and configure a resource required by the application, including a security group resource using the IaaS, so as to complete service security zone division.

The deployment system 110 needs to obtain the design data in the application design file, and a design tool is required to help the application design file provide the interaction interface for the user to perform application design. By means of application design, the user may design an application security zone and enter the design into the application design file for storage.

Application deployment of an IaaS layer device means that the deployment system schedules and drives, according to the application design, a series of interfaces of the IaaS layer device and a peripheral module to complete an operation such as resource application and configuration or application software deployment. Therefore, to implement the present invention, multiple phases such as application design and application deployment and scheduling need to be coordinated.

It should be understood that, cloud computing is a computing manner of obtaining a computing capability from a service provider, and a computing resource, a storage resource, and a network resource required for providing the computing capability are virtual. A virtual machine is a computing node provided by a cloud computing service. Security zones are sub-networks or networks in a same system that have a same security protection requirement and trust each other and that have a same security access control policy and a same boundary control policy, and same network security zones share a same security policy. The security zone may be broadly understood as a set of IT system elements that have a same service requirement and a same security requirement, and a firewall needs to be disposed between different security zones to perform security protection. The firewall is an apparatus that assists in ensuring information security, and allows or limits pass of transmitted data according to a specific rule. A tenant is a user that uses, by using a cloud computing service interface, various resources provided by cloud computing in a cloud computing environment. An application is a software system that is established by using a resource such as a network resource, a storage resource, or a computing resource provided by cloud computing and that can provide a specific capability externally. The application includes a series of computing nodes that run software instances, and the nodes perform network communication with each other. A security group is a virtual resource that is on an OpenStack cloud computing management platform and that is used to perform network traffic control area management in a security zone. The security group may configure a control policy of inflow or outflow traffic, and the security group may pertain to a tenant. Generally, the security zone and the security group are in a one-to-one correspondence.

Figure 2:
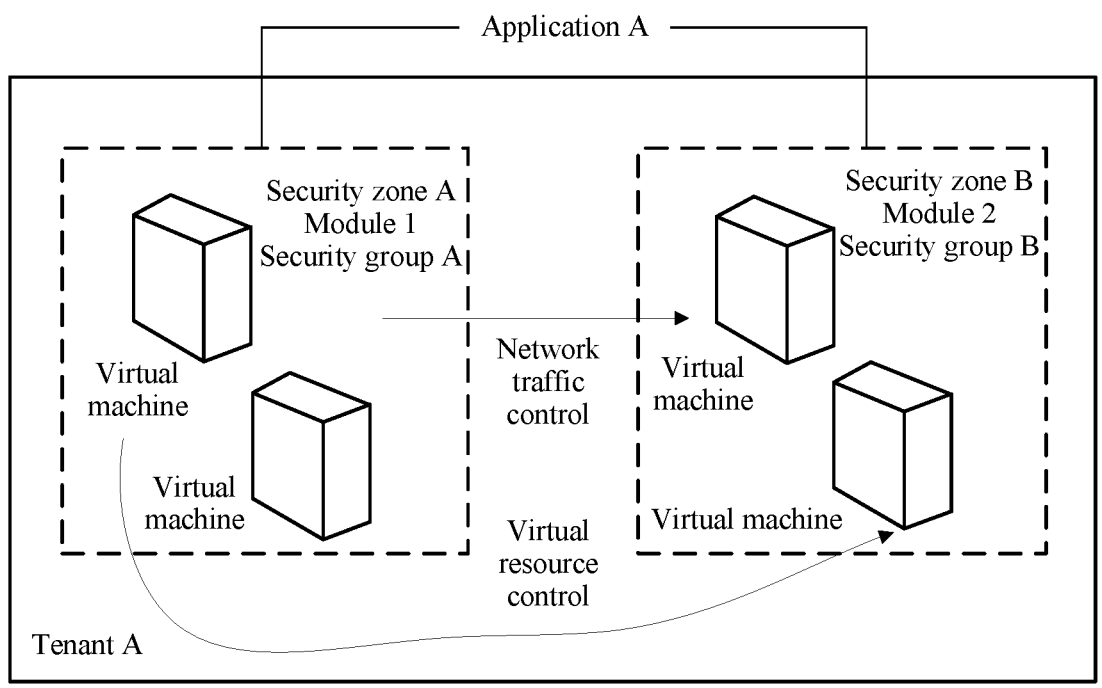
FIG. 2 is a schematic block diagram of an embodiment of existing application deployment.

FIG. 2 is a schematic block diagram of an embodiment of application deployment.

As shown in FIG. 2, an application A includes two modules: a module 1 and a module 2. The module 1 is located in a security zone A, and the security zone A is corresponding to a security group A. The module 2 is located in a security zone B, and the security zone B is corresponding to a security group B. Functions of the module 1 and the module 2 are both implemented by multiple virtual machines VMs. Cross-security-group network traffic control between the module 1 and the module 2 is implemented by configuring an accessible security group identifier in a VM in the module 1 and a VM in the module 2.

However, the application A pertains to a tenant A. Both the security zone A and the security zone B are created by the tenant A; therefore, in this application, a virtual resource at an IaaS layer pertains to the tenant A, and a cross-security-group virtual resource cannot be isolated.

Figure 3:
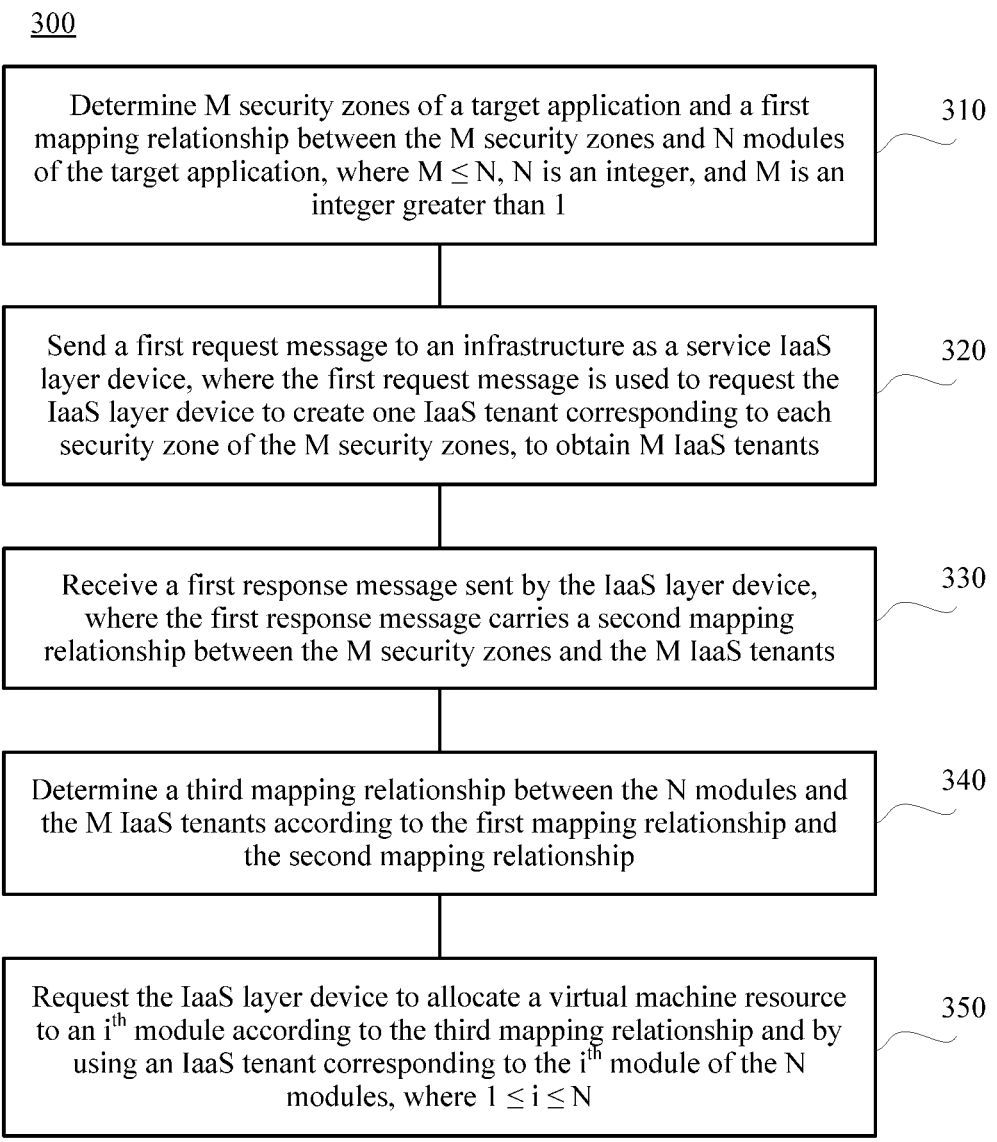
FIG. 3 is a schematic block diagram of a resource configuration method according to an embodiment of the present invention.

FIG. 3 is a schematic block diagram of a resource configuration method according to an embodiment of the present invention. The method may be executed by a deployment system. As shown in FIG. 3, the method 300 includes the following steps.

Step 310: The deployment system determines M security zones of a target application and a first mapping relationship between the M security zones and N modules of the target application, where M≤N, N is an integer, and M is an integer greater than 1.

Specifically, the target application is divided into the M security zones, and the first mapping relationship exists between the N modules included in the target application and the M security zones. That is, one or more modules are located in one security zone, and the target application may be obtained from local storage of the deployment system, or may be obtained in a manner of deploying the target application by a user. The present invention is not limited thereto.

In an embodiment of the present invention, determining the M security zones of the target application and the first mapping relationship between the M security zones and the N modules of the target application includes: obtaining identifier information of each security zone of the M security zones from an application design template of the target application; obtaining identifier information of each module of the N modules and obtaining identifier information of a security zone corresponding to each module of the N modules from the application design template of the target application; and determining the first mapping relationship between the M security zones and the N modules according to the identifier information of each security zone of the M security zones and the identifier information of the security zone corresponding to each module of the N modules.

Specifically, the user enters an application design of the target application into the deployment system, and the deployment system obtains the first mapping relationship according to the application design of the target application. The application design of the target application includes an application identifier of the target application, a list of the N modules, and a list of the M security zones. A module design of an $i^{th}$ module of the N modules may further include at least one of the following: a module identifier of the $i^{th}$ module, an identifier of a security zone to which the module pertains, a VM specification of at least one VM that pertains to the module, or a security zone identifier of a $j^{th}$ security zone of the M security zones.

Further, a VM specification design of the VM specification further includes a network adapter list of the VM, and each network adapter specification of the network adapter list includes an identifier of the network adapter and an identifier of a security zone with which the network adapter can communicate.

Optionally, in an embodiment of the present invention, allocating a virtual machine resource to the $i^{th}$ module by using an IaaS tenant corresponding to the $i^{th}$ module of the N modules includes: creating one port object for each network adapter of the VM by invoking an IaaS interface; recording a mapping relationship between the VM network adapter and the port; obtaining a list of specified security zones with which each network adapter can communicate in the design; sequentially reading an IaaS security group corresponding to the security zone; and updating a corresponding security group into a communicable list of the port by invoking the IaaS interface.

It should be understood that other software installation and configuration operations and the like further need to be performed to complete deployment of the target application. Details are not described herein.

It should be understood that before step 310, the deployment system may determine, according to a data structure of the target application, whether the target application has multiple security zones. If division of multiple security zones exists, the foregoing process is performed.

Step 320: The deployment system sends a tenant creation request to an IaaS layer device, where the tenant creation request includes identifier information of each security zone of the M security zones, so that the IaaS layer device creates, according to the identifier information of each security zone of the M security zones, one IaaS tenant corresponding to each security zone of the M security zones, to obtain M IaaS tenants.

Specifically, in step 320, the deployment system sends the tenant creation request to the IaaS layer device, where the request is used to request the IaaS layer device to create one corresponding tenant for each security zone of the M security zones by using an administrator user.

Step 330: The IaaS layer device receives the tenant creation request sent by the deployment device, where the tenant creation request carries the identifier information of each security zone of the M security zones of the target application, and M is an integer greater than 1; creates, according to the tenant creation request, one IaaS tenant corresponding to each security zone of the M security zones, to obtain the M IaaS tenants and a second mapping relationship between the M IaaS tenants and the M security zones; and returns a tenant creation response to the deployment device, where the tenant creation response carries the second mapping relationship.

Step 340: The deployment system receives the tenant creation response sent by the IaaS layer device, where the tenant creation response includes the second mapping relationship.

Specifically, the tenant creation response sent by the IaaS layer device is received, and the tenant creation response carries the second mapping relationship between the M security zones and the M IaaS tenants. That is, the tenant creation response carries identifier information of the M security zones and identifier information of the M IaaS tenants, and the deployment system stores identifiers of the M security zones and identifiers of the M IaaS tenants and determines the second mapping relationship between the M security zones and the M IaaS tenants.

Step 350: The deployment system determines a third mapping relationship between the N modules and the M IaaS tenants according to the first mapping relationship and the second mapping relationship.

It should be understood that the deployment system may locally store the first mapping relationship, the second mapping relationship, or the third mapping relationship, so as to allocate a virtual resource to the N modules according to the mapping relationship.

Step 360: The deployment system sends a resource allocation request to the IaaS layer device, to request the IaaS layer device to allocate a virtual machine resource to an $i^{th}$ module according to the resource allocation request and by using an IaaS tenant corresponding to the $i^{th}$ module of the N modules, where 1≤i≤N, and the resource allocation request includes the third mapping relationship.

Step 370: The IaaS layer device receives the resource allocation request sent by the deployment device, where the resource allocation request carries the third mapping relationship between the N modules and the M IaaS tenants, 1≤i≤N, M≤N, and N is an integer; and allocates a virtual resource to the $i^{th}$ module according to the third mapping relationship and by using the IaaS tenant corresponding to the $i^{th}$ module of the N modules.

Specifically, because the deployment system has obtained the correspondence between the N modules and the M IaaS tenants, the virtual machine resource is allocated to the $i^{th}$ module according to the third mapping relationship determined in step 350 and by using the IaaS tenant corresponding to the $i^{th}$ module of the N modules. When invoking the IaaS interface to apply for the virtual machine resource, the deployment system needs to transfer identity authentication data of the tenant. Therefore, creating a VM resource by using identity authentication data of the IaaS tenant corresponding to the $i^{th}$ module is allocating the virtual machine resource to the $i^{th}$ module by using the IaaS tenant corresponding to the $i^{th}$ module.

Optionally, in an embodiment of the present invention, the resource allocation request further includes a resource specification of each module of the N modules, so that the IaaS layer device allocates virtual resources to the N modules according to the third mapping relationship and the resource specification of each module of the N modules.

Specifically, the IaaS layer device may allocate the virtual resource to the $i^{th}$ module according to a resource specification of the $i^{th}$ module of the N modules.

It should be understood that the resource specification of the $i^{th}$ module includes a network adapter list corresponding to the $i^{th}$ module, and includes a network adapter identifier of each network adapter and a list of security zones with which each network adapter can communicate.

A solution of a case in which a security group exists in a security zone is further described below.

Optionally, in an embodiment of the present invention, determining M security groups corresponding to the M security zones includes: sending a security group creation request to the IaaS layer device, where the security group creation request is used to request the IaaS layer device to create one security group corresponding to each security zone of the M security zones, to obtain the M security groups; and receiving a security group response message sent by the IaaS layer device, where the security group response message carries a fourth mapping relationship between the M security zones and the M security groups.

Specifically, the deployment system sends the security group creation request to the IaaS layer device for invoking the IaaS interface to create one IaaS security group for each security zone. Further, the deployment system receives identifiers that are of the M security groups and that are sent by the IaaS layer device, and records the mapping relationship between the M security zones and the M security groups.

Further, when the resource specification of the virtual resource of the $i^{th}$ module includes a security zone list to which a module that communicates with the $i^{th}$ module pertains, a specific implementation is to configure a security group corresponding to each security zone in the security zone list as an allowed access security group of the $i^{th}$ module.

According to the foregoing method, after the virtual resource is allocated to the $i^{th}$ module, the $i^{th}$ module has an access permission to a security group in an allowed access security group list. When the $i^{th}$ module has an access permission to a security group, the security group to which the $i^{th}$ module pertains may manage network traffic generated by a VM network adapter created by a tenant corresponding to the $i^{th}$ module.

Therefore, according to this embodiment of the present invention, the application is divided into at least two security zones, one corresponding IaaS tenant is created in each security zone of the at least two security zones, and a required virtual machine resource is allocated, by using the IaaS tenant corresponding to each security zone, to a module corresponding to the security zone. In this way, the created application can implement virtual resource isolation between different security zones.

Further, a security group is created in each security zone of the at least two security zones, and each security group is configured to be used by a tenant corresponding to the security zone to which the security group pertains. Therefore, cross-security-zone network traffic control can be implemented.

Therefore, by using the foregoing resource deployment solution, cross-security-group network traffic control and virtual resource isolation are implemented. The target application is divided into different modules of different security zones, so that network traffic can be controlled, and virtual resource isolation can be implemented.

According to this embodiment of the present invention, the application is divided into at least two security zones, one corresponding IaaS tenant is created in each security zone of the at least two security zones, and a required virtual resource is allocated, by using the IaaS tenant corresponding to each security zone, to a module corresponding to the security zone. In this way, virtual resource isolation can be implemented by dividing the application into different modules of different security zones.

Figure 4:
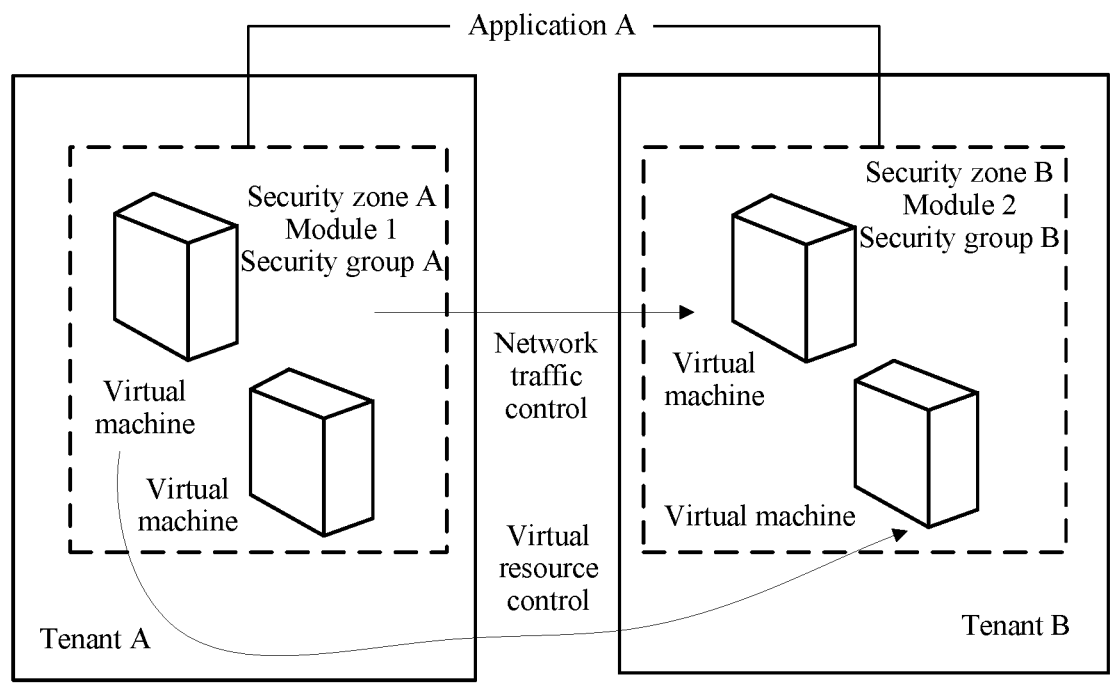
FIG. 4 is a schematic block diagram of an embodiment of application deployment according to the present invention.

FIG. 4 is a schematic block diagram of an embodiment of application deployment according to the present invention.

As shown in FIG. 4, an application A is divided into a security zone A and a security zone B, a tenant A is created in the security zone A, and a tenant B is created in the security zone B. In addition, the application A includes two modules: a module 1 and a module 2, and the module 1 and the module 2 of the application A pertain to the security zone A and the security zone B respectively. That is, the module 1 and the module 2 respectively pertain to the tenant A and the tenant B. It is configured that the tenant A can access a security group A and a security group B, and it is configured that the tenant B can access the security group A and the security group B. Therefore, network traffic control between the security zone A and the security zone B can be implemented by using the security group A and the security group B. In addition, because a virtual resource between the tenant A and the tenant B is isolated, cross-security-zone virtual resource isolation can be implemented.

The module 1 is located in the security group A, the module 2 is located in the security group B, and functions of the module 1 and the module 2 are both implemented by multiple VMs. Cross-security-zone network traffic control between the module 1 and the module 2 can be implemented by configuring a VM in the module 1 and a VM in the module 2 in the security group.

Therefore, the embodiment of application deployment shown in FIG. 4 can implement both cross-security-group network traffic control and cross-security-group virtual resource isolation.

According to this embodiment of the present invention, the application is divided into at least two security zones, one corresponding IaaS tenant is created in each security zone of the at least two security zones, and a required virtual machine resource is allocated, by using the IaaS tenant corresponding to each security zone, to a module corresponding to the security zone. In this way, virtual resource isolation can be implemented by dividing the application into different modules of different security zones.

Figure 5:
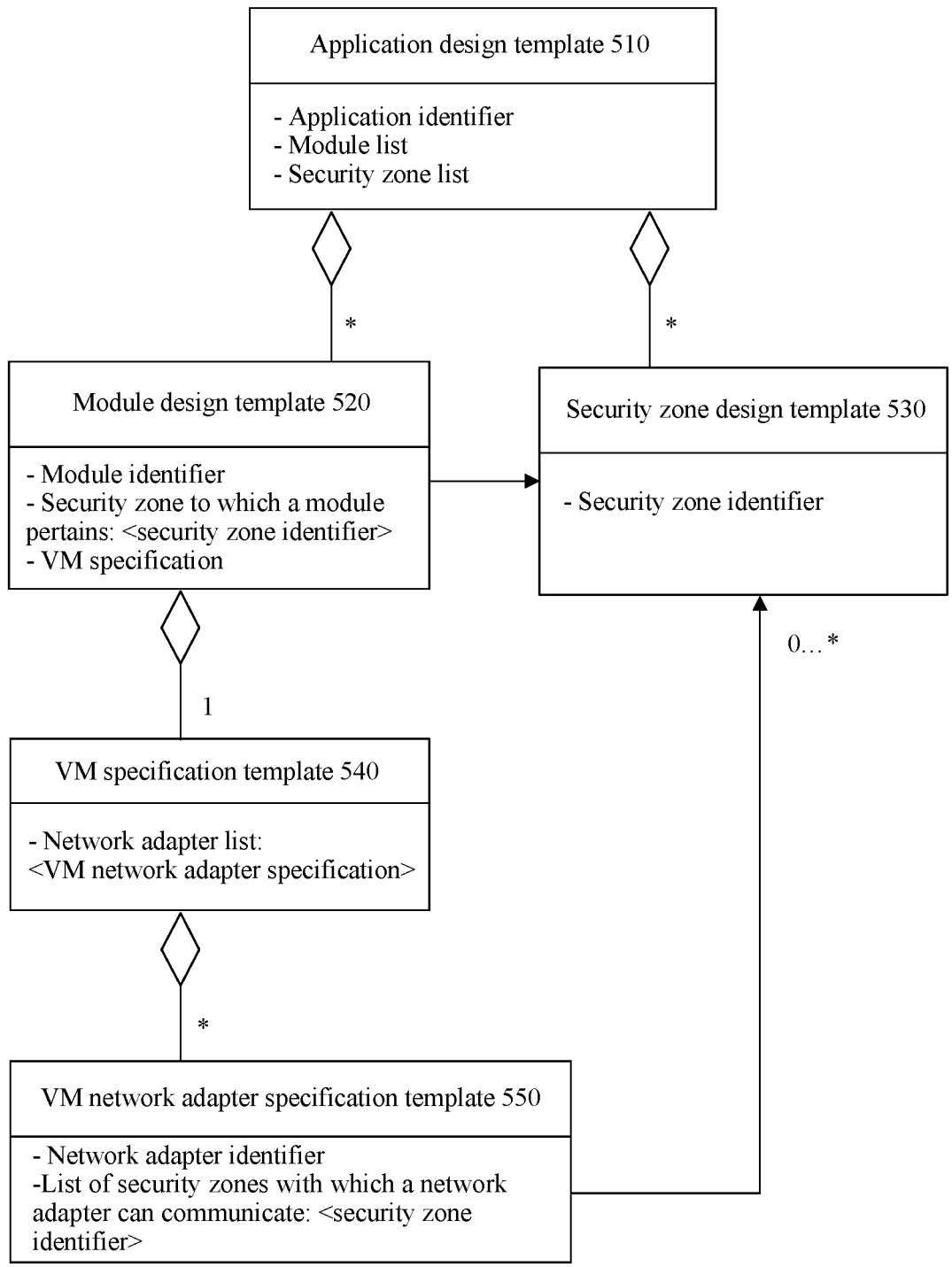
FIG. 5 is a schematic diagram of a data structure of an application design template according to an embodiment of the present invention.

FIG. 5 is a schematic diagram of a data structure of an application design template according to an embodiment of the present invention. The mapping relationship obtained in the embodiment shown in FIG. 3 may be obtained by using the application design template shown in FIG. 5.

As shown in FIG. 5, an application design template 510 includes an application identifier, a module list, and a security zone list. The module list includes at least two modules, the security zone list includes at least two security zones, and a quantity of modules is greater than or equal to a quantity of security zones.

A lower layer of the application design template 510 includes a module design template 520. The module design template 520 includes an identifier of a module, a security zone (such as a security zone identifier) to which the module pertains, and a VM specification.

It should be understood that each module included in the application design template 510 is corresponding to one module design. In FIG. 5, a symbol * between the application design template 510 and the module design template 520 represents a quantity of module designs corresponding to the application design template 510. For example, if the application design template 510 includes two modules, the symbol * represents 2.

The lower layer of the application design template 510 further includes a security zone template 530, and the security zone template 530 includes a security zone identifier. It should be understood that each security zone included in the application design template 510 is corresponding to one security zone design. In FIG. 5, a symbol * between the application design template 510 and the security zone template 530 represents a quantity of security zone designs corresponding to each application design. For example, if the application design template 510 includes two security zones, the symbol * represents 2.

A lower layer of the module design template 520 includes a VM specification design template 540, the VM specification design template 540 includes a network adapter list, and the network adapter list includes one or more VM network adapter specification designs. It should be understood that one module design is corresponding to one VM specification design.

A lower layer of the VM specification design template 540 includes a VM network adapter specification design template 550, and the VM network adapter specification design template 550 includes a network adapter identifier and a list of security zones with which a network adapter can communicate.

It should be understood that each network adapter in the network adapter list included in the VM specification design template 540 is corresponding to one VM network adapter specification. In FIG. 5, * between the VM specification design template 540 and the VM network adapter specification design template 550 represents a quantity of VM network adapter specification designs corresponding to each VM specification design. For example, if a network adapter list in a VM specification includes three network adapters, * represents 3. Each network adapter specification design includes the network adapter identifier and the list of security zones with which the network adapter can communicate. Specifically, the list of security zones includes an identifier of a security zone with which the network adapter can communicate.

It should be understood that the foregoing numbers are merely examples, and the present invention is not limited thereto.

A specific process of a resource configuration method is described in detail with reference to FIG. 6A and FIG. 6B below.

Figure 6A:
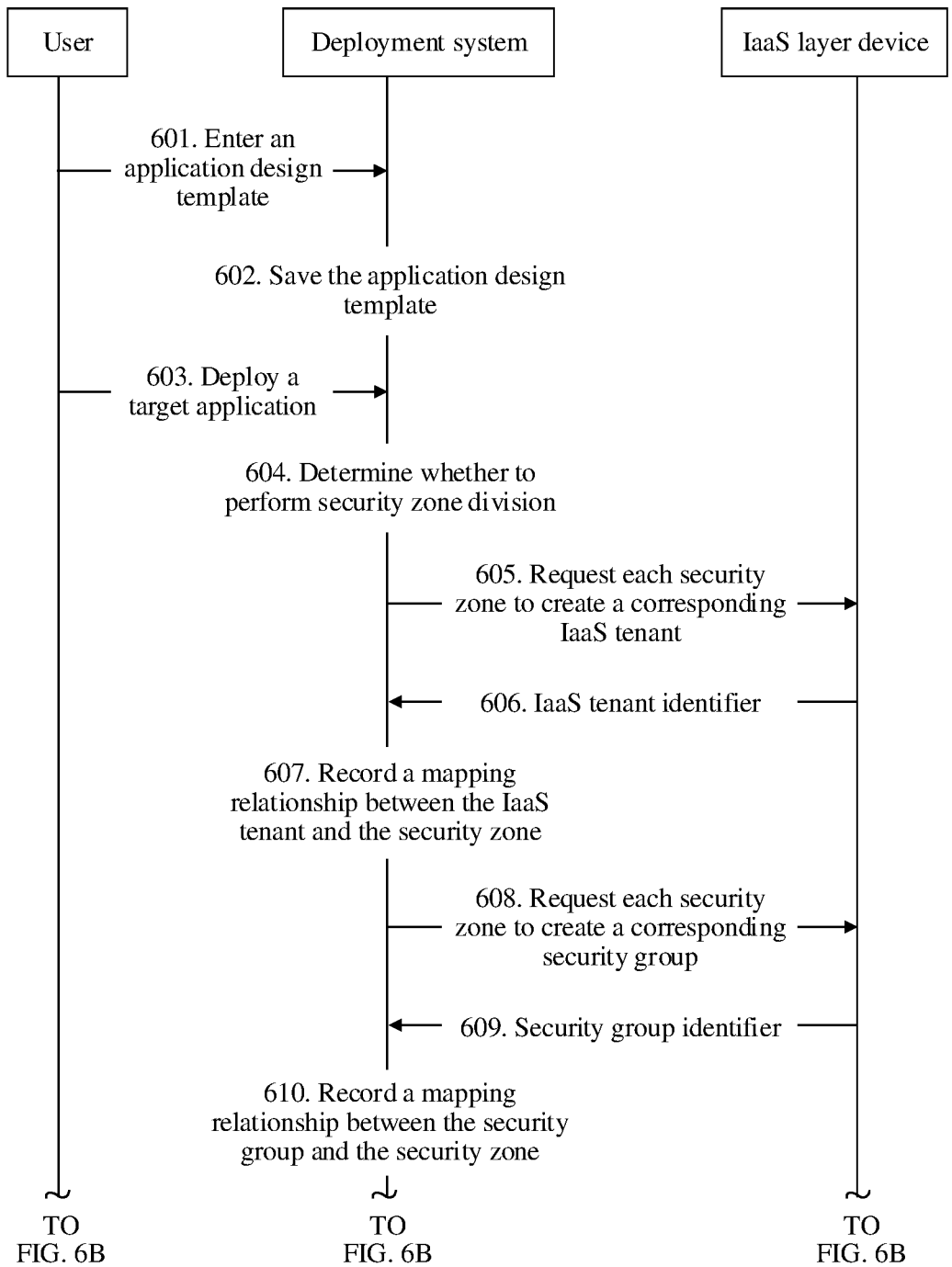
FIG. 6A and FIG. 6B are an interaction flowchart of a resource configuration method according to an embodiment of the present invention.
Figure 6B:
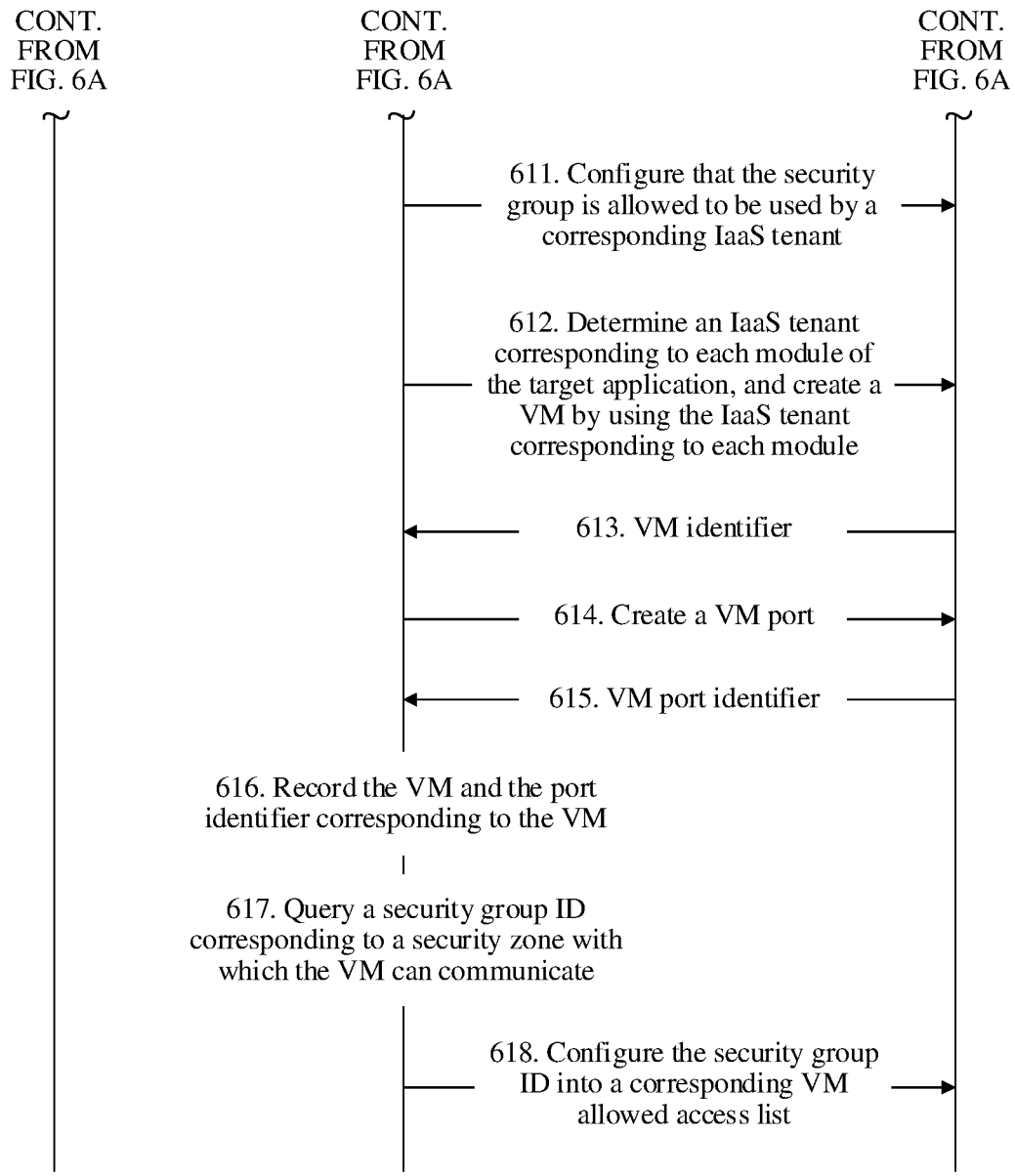

FIG. 6A and FIG. 6B are an interaction flowchart of a resource configuration method according to an embodiment of the present invention. As shown in FIG. 6A and FIG. 6B, the method includes the following steps.

Step 601: A user enters an application design template into a deployment system.

Specifically, the application design template is used to describe a resource topological structure of an application. Referring to FIG. 6A and FIG. 6B for the application design template, the application design needs to include a unique identifier of the application, a list of all module designs in the application, and all security zones planned by the application. Each security zone needs to describe a unique identifier. A module design needs to describe a unique identifier and a VM specification of a module, and specify a security zone identifier to which the module pertains. The VM specification of the module needs to describe a VM network adapter list. Each VM network adapter needs to specify one or more identifies of security zones with which the network adapter can communicate.

Step 602: The deployment system saves the application design template.

Step 603: The user deploys a target application by using the application design template. It should be understood that the target application is a specific application that the user requests to create.

Specific steps of step 601 to step 603 are corresponding to step 310 of the embodiment shown in FIG. 3, and details are not described herein.

Step 604: The deployment system parses an application design of the target application, to determine whether security zone division needs to be performed.

Specifically, if the application design of the target application includes at least two security zones, the target application is divided into the two security zones when the target application is deployed.

If it is determined that security zone division needs to be performed, security zone division and configuration operations are performed; if security zone division does not need to be performed, application deployment is implemented according to an existing application deployment process.

When security zone division needs to be performed, the following steps need to be performed:

Step 605: The deployment system invokes an IaaS administrator user preconfigured by an IaaS layer device, to create an IaaS tenant for each security zone in the design, where one security zone is corresponding to one IaaS tenant, and saves a mapping relationship between multiple IaaS tenants and multiple security zones, where multiple means at least two.

It should be understood that step 605 is corresponding to step 320 and step 330 of the embodiment shown in FIG. 3, and details are not described herein.

Step 606: The IaaS layer device returns identifiers of the multiple tenants and the mapping relationship between the multiple tenants and the multiple security zones to the deployment system.

Step 607: The deployment system records the mapping relationship between the multiple tenants and the multiple security zones.

It should be understood that step 606 and step 607 are corresponding to step 340 of the embodiment shown in FIG. 3.

Step 608: The deployment system creates one IaaS security group for each security zone of the multiple security zones by invoking an IaaS interface and using the IaaS administrator account, and records a mapping relationship between the multiple security zones and multiple IaaS security groups.

Step 609: The IaaS layer device returns the mapping relationship between the multiple security zones and the multiple security groups to the deployment system.

Step 610: The deployment system records a security group corresponding to each security zone of the multiple security zones.

Step 611: The deployment system reads data of an IaaS security group and an IaaS tenant that are corresponding to each security zone, and configures, by invoking the IaaS interface and using the administrator user, that an IaaS security group corresponding to a security zone can be used by IaaS tenants corresponding to a same security zone.

Step 612: Query a tenant corresponding to a security zone that is corresponding to each module of multiple modules in the target application design, and create a VM corresponding to each module.

Specifically, an IaaS tenant corresponding to a security zone to which each module pertains is read first, and then a VM of a specified VM specification is created by using the IaaS tenant and invoking the IaaS interface.

Step 613: The IaaS layer device returns a VM identifier corresponding to each module to the deployment system, and the deployment system saves the VM identifier corresponding to each module.

Step 614: The deployment system requests the IaaS layer device to create a network port for each VM of each module.

Specifically, one port object is created for each network adapter of the VM by invoking the IaaS interface.

Step 615: The IaaS layer device returns an identifier of each VM port to the deployment system.

Step 616: The deployment system records a mapping relationship between each VM network adapter and a port of the VM network adapter, that is, records a port identifier corresponding to the VM.

Step 617: Query a security group ID corresponding to a security zone with which the VM can communicate.

Step 618: Configure the security group ID into a corresponding VM allowed access list.

Specifically, for each network adapter, a list of specified security zones with which the network adapter can communicate in the target application design is obtained, the IaaS security group corresponding to the security zone is sequentially read, and the corresponding security group is updated into a communicable list of the port by invoking the IaaS interface.

It should be understood that the deployment system further needs to perform other software installation and configuration operations to complete deployment of the application.

Therefore, the VM that is of each module of the application and that is created at this time meets requirements of both resource isolation and security zone division. The VM in each security zone is created by using different IaaS tenants, so that VMs between different security zones are isolated in resource because of an IaaS tenant isolation mechanism. Security group configuration is performed on each network adapter of the VM of each module according to communicable data of the security zone, so that communication between network adapters is subject to a security group traffic control policy, and a purpose of controlling traffic by dividing the security zone is achieved.

Figure 7A:
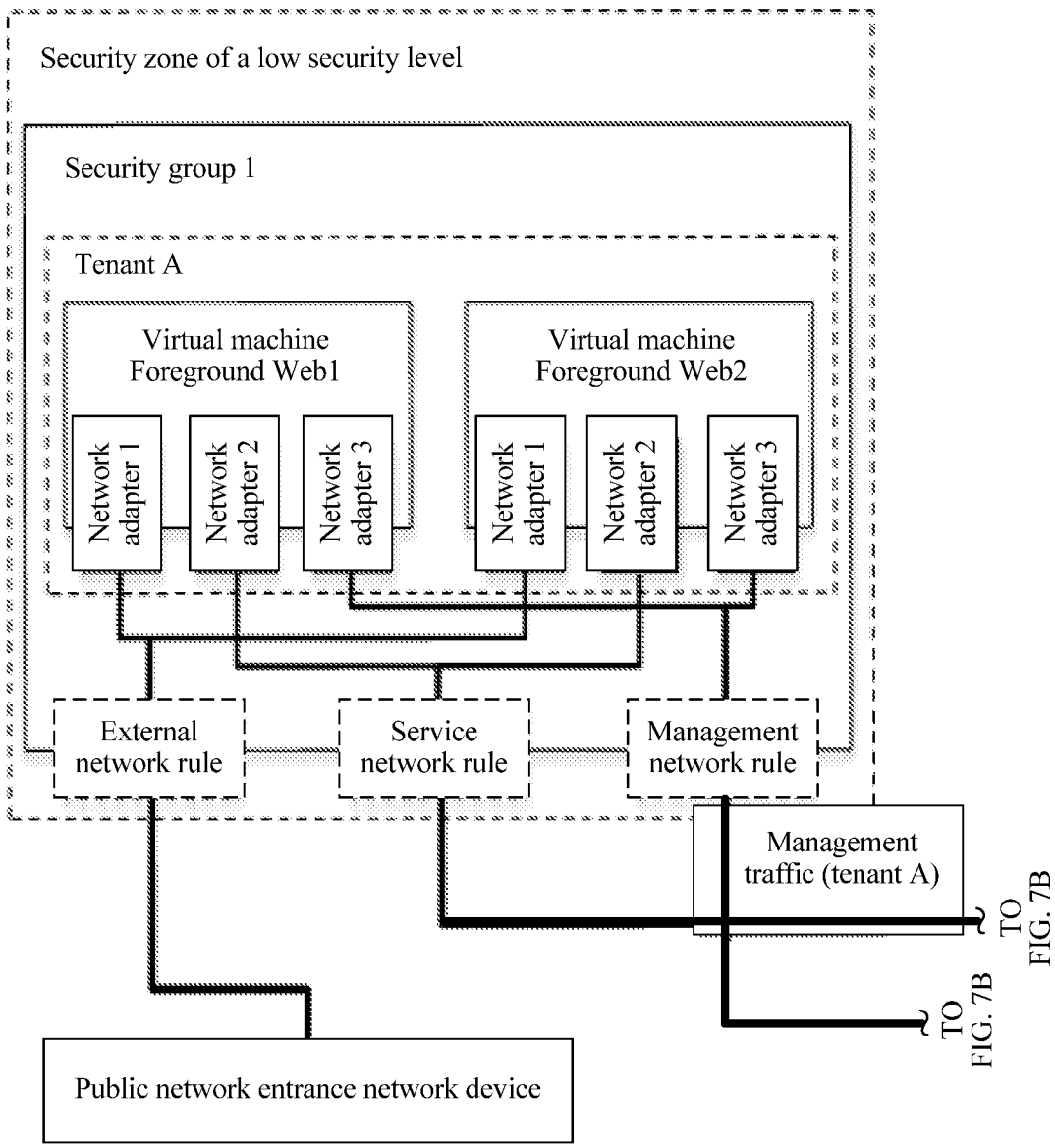
FIG. 7A, FIG. 7B, and FIG. 7C are a schematic block diagram of resource configuration according to an embodiment of the present invention.
Figure 7B:
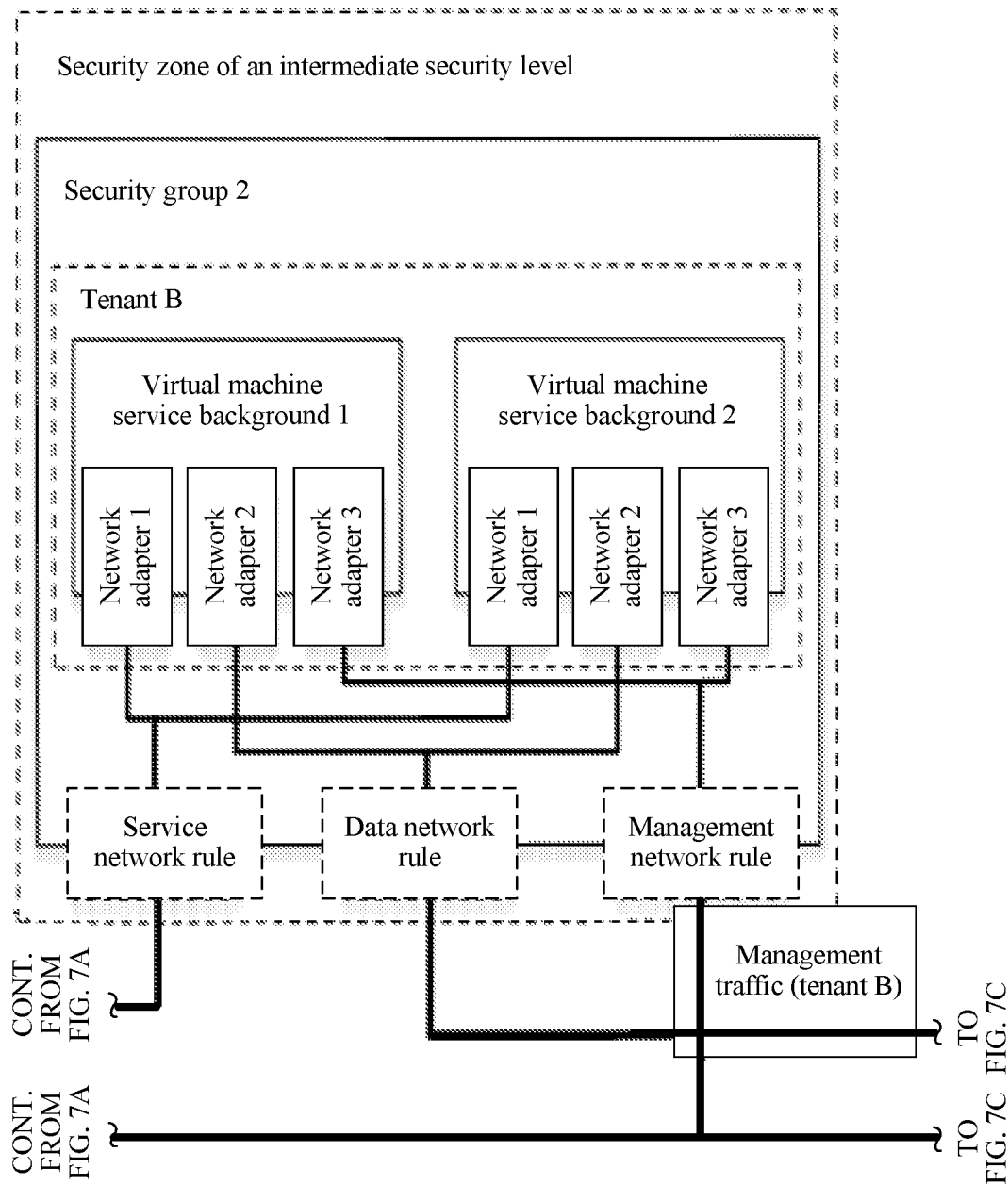
Figure 7C:
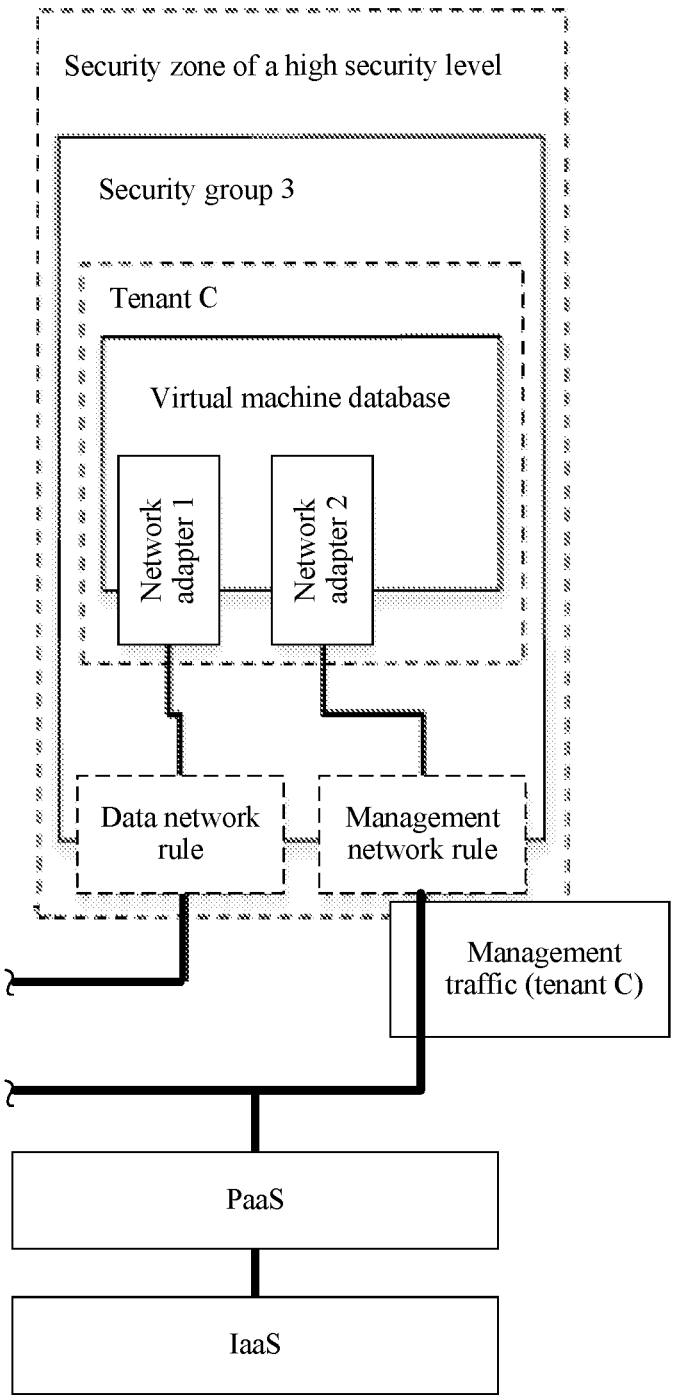

FIG. 7A, FIG. 7B, and FIG. 7C are a schematic block diagram of resource configuration according to an embodiment of the present invention.

The embodiment shown in FIG. 7A, FIG. 7B, and FIG. 7C is a specific embodiment of the foregoing resource configuration method. As shown in FIG. 7A, FIG. 7B, and FIG. 7C, a target application is a Web Web application 700, and the application 700 includes the following modules: a foreground Web module 710, a service background module 720, and a database module 730. The foreground Web module 710 is configured to process a Web request of a public network user. The service background module 720 is configured to implement service core logic. The database module 730 is configured to be responsible for storing user and service data.

Specifically, the foreground Web module 710 is a cluster including multiple nodes. Two virtual machine nodes listed in FIG. 7A, FIG. 7B, and FIG. 7C are a virtual machine foreground Web1 and a virtual machine foreground Web2. Because the foreground Web module 710 needs to communicate with a public network entrance network device to process a public network request, a security level is relatively low, and the foreground Web module 710 needs to be classified into a security zone of a low level. In addition, the foreground Web module 710 needs to communicate with the service background module 720 to process a user request.

Specifically, the service background module 720 is a core module for the application to implement service logic. The service background module 720 needs to receive and process a request of the foreground Web module 710, and needs to communicate with the database module 730 to store user data and service data that are generated in a service processing process. Because logic in the module is a service core, and security protection needs to be performed, the module needs to be classified into a security zone of an intermediate level.

Specifically, the database module 730 is configured to be responsible for storing the user and service data. The database module 730 communicates only with the service background module 720, and the data usually relates to user sensitive data and data related to service competitiveness; therefore, reliable protection is required. The module needs to be classified into a security zone of a high level.

Therefore, network traffic control configuration of three security zones required in the Web application is shown in Table 1.

TABLE 1

| Transmit end | Receive end | | | |
| --- | --- | --- | --- | --- |
| | Public network | Security zone of a low security level | Security zone of an intermediate security level | Security zone of a high security level |
| Public network | — | Communicable | Incommunicable | Incommunicable |
| Security zone of a low security level | Communicable | — | Communicable | Incommunicable |
| Security zone of an intermediate security level | Incommunicable | Communicable | — | Communicable |
| Security zone of a high security level | Incommunicable | Incommunicable | Communicable | — |

According to this embodiment of the present invention, the application is divided into at least two security zones, one corresponding IaaS tenant is created in each security zone of the at least two security zones, and a required virtual machine resource is allocated, by using the IaaS tenant corresponding to each security zone, to a module corresponding to the security zone. In this way, virtual resource isolation can be implemented by dividing the application into different modules of different security zones.

The resource configuration method in the embodiments of the present invention and a specific process are described in detail with reference to FIG. 1 to FIG. 7C above. A network device used for resource configuration in the embodiments of the present invention is described in detail with reference to FIG. 8 to FIG. 11 below.

Figure 8:
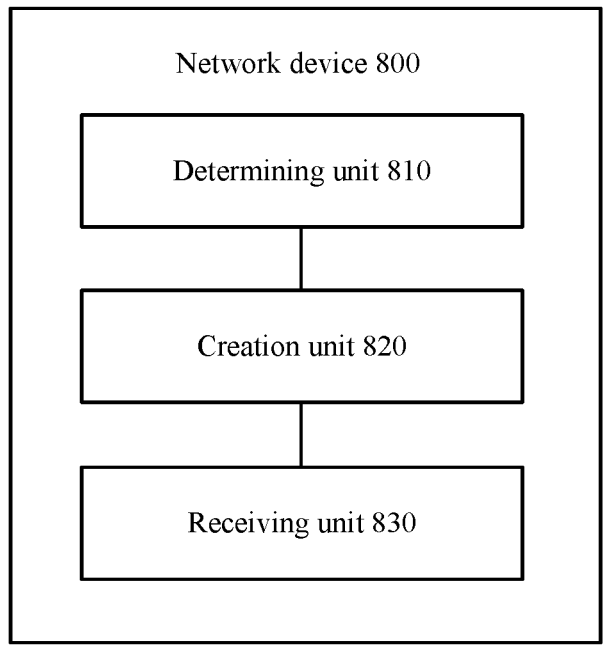
FIG. 8 is a schematic block diagram of a network device according to an embodiment of the present invention.

FIG. 8 is a schematic block diagram of a network device according to an embodiment of the present invention. As shown in FIG. 8, the network device includes:

a determining unit 810, configured to determine M security zones of a target application and a first mapping relationship between the M security zones and N modules of the target application, where M≤N, N is an integer, and M is an integer greater than 1;

a creation unit 820, configured to send a tenant creation request to an infrastructure as a service IaaS layer device, where the tenant creation request includes identifier information of each security zone of the M security zones, so that the IaaS layer device creates, according to the identifier information of each security zone of the M security zones, one IaaS tenant corresponding to each security zone of the M security zones, to obtain M IaaS tenants; and a receiving unit 830, configured to receive a tenant creation response sent by the IaaS layer device, where the tenant creation response carries a second mapping relationship between the M security zones and the M IaaS tenants.

The determining unit 810 is further configured to determine a third mapping relationship between the N modules and the M IaaS tenants according to the first mapping relationship and the second mapping relationship.

A sending unit is further configured to send a resource allocation request to the IaaS layer device, to request the IaaS layer device to allocate a virtual machine resource to an $i^{th}$ module according to the resource allocation request and by using an IaaS tenant corresponding to the $i^{th}$ module of the N modules, where 1≤i≤N, and the resource allocation request includes the third mapping relationship.

Optionally, in an embodiment of the present invention, the resource allocation request further includes a resource specification of the $i^{th}$ module of the N modules.

Optionally, in an embodiment of the present invention, the determining unit 810 is configured to: obtain the identifier information of each security zone of the M security zones from an application design template of the target application; obtain identifier information of each module of the N modules and obtain identifier information of a security zone corresponding to each module of the N modules from the application design template of the target application; and determine the first mapping relationship between the M security zones and the N modules according to the identifier information of each security zone of the M security zones and the identifier information of the security zone corresponding to each module of the N modules.

The network device in this embodiment of the present invention may be corresponding to the resource configuration method in the embodiments of the present invention. In addition, each unit/module in the apparatus and another operation and/or function above are separately intended to implement a corresponding process of the method shown in the deployment system in FIG. 1 to FIG. 7C. For brevity, details are not described herein.

According to this embodiment of the present invention, the application is divided into at least two security zones, one corresponding IaaS tenant is created in each security zone of the at least two security zones, and a required virtual machine resource is allocated, by using the IaaS tenant corresponding to each security zone, to a module corresponding to the security zone. In this way, virtual resource isolation can be implemented by dividing the application into different modules of different security zones.

Figure 9:
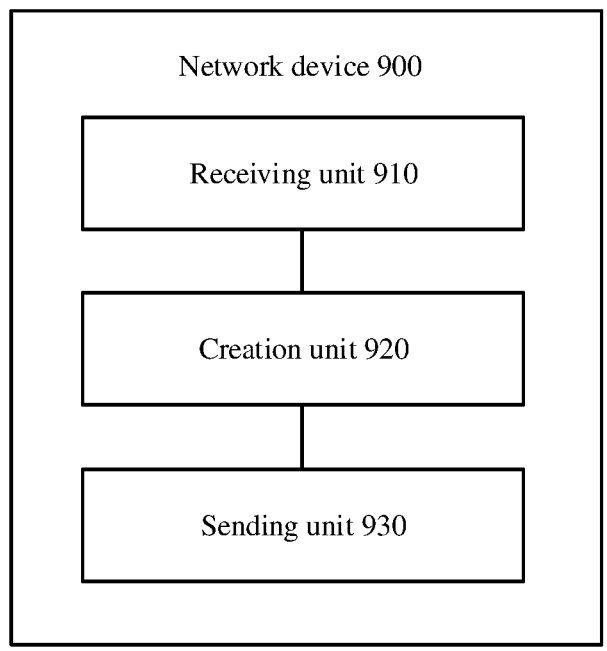
FIG. 9 is a schematic block diagram of a network device according to another embodiment of the present invention.

FIG. 9 is a schematic block diagram of a network device according to another embodiment of the present invention. As shown in FIG. 9, a network device 900 includes:

a receiving unit 910, configured to receive a tenant creation request sent by a deployment device, where the tenant creation request carries identifier information of each security zone of M security zones of a target application, and M is an integer greater than 1;

a creation unit 920, configured to create, according to the tenant creation request, one IaaS tenant corresponding to each security zone of the M security zones, to obtain M IaaS tenants and a second mapping relationship between the M IaaS tenants and the M security zones;

a sending unit 930, configured to return a tenant creation response to the deployment device, where the tenant creation response carries the second mapping relationship, where the receiving unit 910 is further configured to receive a resource allocation request sent by the deployment device, where the resource allocation request carries a third mapping relationship between N modules and the M IaaS tenants, $1 \leq i \leq N$, $M \leq N$, and N is an integer; and a resource allocation unit 940, configured to allocate a virtual resource to an $i^{th}$ module according to the third mapping relationship and by using an IaaS tenant corresponding to the $i^{th}$ module of the N modules.

Optionally, in an embodiment of the present invention, the resource allocation request carries a resource specification of each module of the N modules, and the resource allocation unit 940 is configured to allocate the virtual resource to the $i^{th}$ module according to a resource specification of the $i^{th}$ module of the N modules.

According to this embodiment of the present invention, the application is divided into at least two security zones, one corresponding IaaS tenant is created in each security zone of the at least two security zones, and a required virtual machine resource is allocated, by using the IaaS tenant corresponding to each security zone, to a module corresponding to the security zone. In this way, virtual resource isolation can be implemented by dividing the application into different modules of different security zones.

Figure 10:
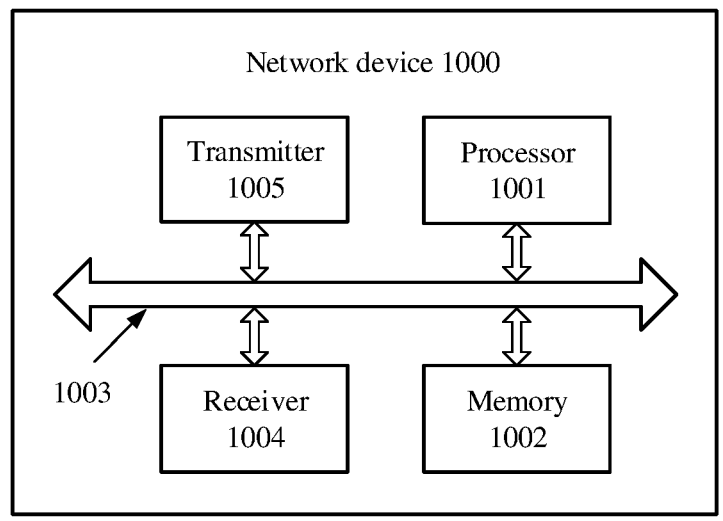
FIG. 10 is a schematic apparatus diagram of a network device according to an embodiment of the present invention.

FIG. 10 is a schematic apparatus diagram of a network device according to an embodiment of the present invention.

As shown in FIG. 10, this embodiment of the present invention further provides a network device 1000, and the network device 1000 includes a processor 1001, a memory 1002, a bus system 1003, and a receiver 1004. The processor 1001, the memory 1002, and the receiver 1004 are connected by using the bus system 1003. The memory 1002 is configured to store an instruction, and the processor 1001 is configured to execute the instruction stored in the memory 1002, and control the receiver 1004 to receive information. The network device 1000 can implement a corresponding process in the foregoing method embodiment. To avoid repetition, details are not described herein.

It should be understood that, in this embodiment of the present invention, the processor 1001 may be a central processing unit (CPU), or the processor 1001 may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor, or the like.

The memory 1002 may include a read-only memory and a random access memory, and provide an instruction and data for the processor 1001. A part of the memory 1002 may further include a nonvolatile random access memory. For example, the memory 1102 may further store information about a device type.

The bus system 1003 may further include a power bus, a control bus, a status signal bus, and the like, in addition to a data bus. However, for clear description, various buses in the figure are marked as the bus system 1003.

In an implementation process, each step of the foregoing method may be completed by using an integrated logic circuit of hardware in the processor 1001 or an instruction in a form of software. Steps of the method disclosed with reference to the embodiments of the present invention may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory 1002. The processor 1001 reads information in the memory 1002 and completes steps of the foregoing method in combination with the hardware of the processor 1001. To avoid repetition, details are not described herein.

Figure 11:
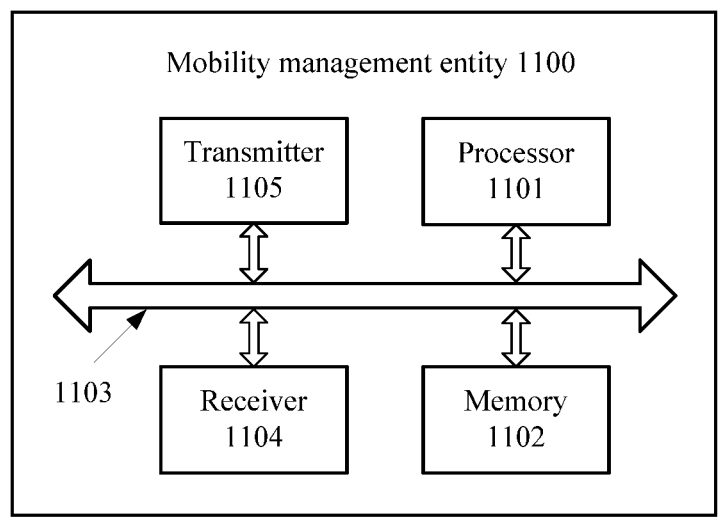
FIG. 11 is a schematic apparatus diagram of a network device according to another embodiment of the present invention.

FIG. 11 is a schematic apparatus diagram of a network device according to another embodiment of the present invention.

As shown in FIG. 11, this embodiment of the present invention further provides a network device 1100, and the network device 1100 includes a processor 1101, a memory 1102, a bus system 1103, and a receiver 1104. The processor 1101, the memory 1102, and the receiver 1104 are connected by using the bus system 1103. The memory 1102 is configured to store an instruction, and the processor 1101 is configured to execute the instruction stored in the memory 1102, and control the receiver 1104 to receive information. The network device 1100 can implement a corresponding process in the foregoing method embodiment. To avoid repetition, details are not described herein.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the conventional art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A resource configuration method in a cloud environment, comprising:
   determining M security zones of a target application and a first mapping relationship between the M security zones and N modules of the target application, wherein M≤N, N is an integer, and M is an integer greater than 1;
   sending a tenant creation request to an infrastructure as a service (IaaS) layer device, wherein the tenant creation request comprises identifier information of each security zone of the M security zones, so that the IaaS layer device creates, according to the identifier information of each security zone of the M security zones, one IaaS tenant associated with each security zone of the M security zones, to obtain M IaaS tenants;
   receiving a tenant creation response sent by the IaaS layer device, wherein the tenant creation response carries a second mapping relationship between the M security zones and the M IaaS tenants;
   determining a third mapping relationship between the N modules and the M IaaS tenants according to the first mapping relationship and the second mapping relationship; and
   sending a resource allocation request to the IaaS layer device, to request the IaaS layer device to allocate a virtual resource to an $i^{th}$ module according to the resource allocation request and by using an IaaS tenant associated with the $i^{th}$ module of the N modules, wherein i is an integer, 1≤i≤N, and the resource allocation request comprises the third mapping relationship.

2. The method according to claim 1, wherein the resource allocation request further comprises a resource specification of each module of the N modules.

3. The method according to claim 1, wherein determining the M security zones of the target application and the first mapping relationship between the M security zones and N modules of the target application comprises:
   obtaining the identifier information of each security zone of the M security zones from an application design template of the target application;
   obtaining identifier information of each module of the N modules and obtaining identifier information of a security zone associated with each module of the N modules from the application design template of the target application; and
   determining the first mapping relationship between the M security zones and the N modules according to the identifier information of each security zone of the M security zones and the identifier information of the security zone associated with each module of the N modules.

4. The method according to claim 2, wherein the determining the M security zones of the target application and the first mapping relationship between the M security zones and N modules of the target application comprises:

obtaining the identifier information of each security zone of the M security zones from an application design template of the target application;

obtaining identifier information of each module of the N modules and obtaining identifier information of a security zone associated with each module of the N modules from the application design template of the target application; and determining the first mapping relationship between the M security zones and the N modules according to the identifier information of each security zone of the M security zones and the identifier information of the security zone associated with each module of the N modules.

5. A virtual resource configuration method in a cloud environment, comprising:

receiving a tenant creation request sent by a deployment device, wherein the tenant creation request carries identifier information of each security zone of M security zones of a target application, and M is an integer greater than 1;

creating, according to the tenant creation request, one infrastructure as a service (IaaS) tenant associated with each security zone of the M security zones, to obtain M IaaS tenants and a second mapping relationship between the M IaaS tenants and the M security zones;

returning a tenant creation response to the deployment device, wherein the tenant creation response carries the second mapping relationship;

receiving a resource allocation request sent by the deployment device, wherein the resource allocation request carries a third mapping relationship between N modules and the M IaaS tenants, M≤N, and N is an integer; and allocating a virtual resource to an $i^{th}$ module according to the third mapping relationship and by using an IaaS tenant associated with the $i^{th}$ module of the N modules, wherein i is an integer, and 1≤i≤N.

6. The method according to claim 5, wherein the resource allocation request carries a resource specification of each module of the N modules, and wherein allocating the virtual resource to the $i^{th}$ module further comprises:

allocating the virtual resource to the $i^{th}$ module according to a resource specification of the $i^{th}$ module of the N modules.

7. A network device, comprising:
a memory that stores executable program code;
a communications interface; and
at least one processor connected to the memory and the communications interface, wherein the executable program code instructs the at least one processor to:
determine M security zones of a target application and a first mapping relationship between the M security zones and N modules of the target application, wherein M≤N, N is an integer, and M is an integer greater than 1;
send a tenant creation request to an infrastructure as a service (IaaS) layer device, wherein the tenant creation request comprises identifier information of each security zone of the M security zones, so that the IaaS layer device creates, according to the identifier information of each security zone of the M security zones, one IaaS tenant associated with each security zone of the M security zones, to obtain M IaaS tenants;

receive a tenant creation response sent by the IaaS layer device, wherein the tenant creation response carries a second mapping relationship between the M security zones and the M IaaS tenants, determine a third mapping relationship between the N modules and the M IaaS tenants according to the first mapping relationship and the second mapping relationship; and send a resource allocation request to the IaaS layer device, to request the IaaS layer device to allocate a virtual machine resource to an $i^{th}$ module according to the resource allocation request and by using an IaaS tenant associated with the $i^{th}$ module of the N modules, wherein i is an integer, 1≤i≤N, and the resource allocation request comprises the third mapping relationship.

8. The network device according to claim 7, wherein the resource allocation request further comprises a resource specification of the $i^{th}$ module of the N modules.

9. The network device according to claim 7, wherein the executable program code instructs the at least one processor to:

obtain the identifier information of each security zone of the M security zones from an application design template of the target application;

obtain identifier information of each module of the N modules and obtain identifier information of a security zone associated with each module of the N modules from the application design template of the target application; and determine the first mapping relationship between the M security zones and the N modules according to the identifier information of each security zone of the M security zones and the identifier information of the security zone associated with each module of the N modules.

10. The network device according to claim 8, wherein the executable program code instructs the at least one processor to:

obtain the identifier information of each security zone of the M security zones from an application design template of the target application;

obtain identifier information of each module of the N modules and obtain identifier information of a security zone associated with each module of the N modules from the application design template of the target application; and determine the first mapping relationship between the M security zones and the N modules according to the identifier information of each security zone of the M security zones and the identifier information of the security zone associated with each module of the N modules.

* * * * *